US012695964B2

(12) United States Patent
Knop

(10) Patent No.: US 12,695,964 B2
(45) Date of Patent: Jul. 28, 2026

(54) MEANS OF LOCOMOTION AND ARRANGEMENT FOR RECORDING AN INFRARED IMAGE

(71) Applicant: Bayerische Motoren Werke Aktiengesellschaft, Munich (DE)

(72) Inventor: Michel Knop, Affing (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 18/724,164

(22) PCT Filed: Jul. 25, 2022

(86) PCT No.: PCT/EP2022/070744
§ 371 (c)(1),
(2) Date: Jun. 25, 2024

(87) PCT Pub. No.: WO2023/131429
PCT Pub. Date: Jul. 13, 2023

(65) Prior Publication Data
US 2025/0071398 A1 Feb. 27, 2025

(30) Foreign Application Priority Data
Jan. 10, 2022 (DE) .................... 10 2022 100 331.0

(51) Int. Cl.
*H04N 23/20* (2023.01)
*G03B 15/05* (2021.01)
(Continued)

(52) U.S. Cl.
CPC ............. *H04N 23/20* (2023.01); *G03B 15/05* (2013.01); *G03B 15/06* (2013.01); *G03B 30/00* (2021.01);
(Continued)

(58) Field of Classification Search
CPC ........ H04N 23/20; H04N 23/52; H04N 23/55; H04N 23/56; G03B 15/05; G03B 2215/0567
See application file for complete search history.

(56) References Cited

U.S. PATENT DOCUMENTS

2004/0160786 A1 * 8/2004 Bauer .................. B60Q 1/2696
362/545
2016/0044215 A1 2/2016 Tsujikawa et al.
(Continued)

FOREIGN PATENT DOCUMENTS

DE 102014215856 A1 2/2016
DE 102019216328 A1 * 4/2021 ............. H04N 23/56
JP 2004136760 A 5/2004

OTHER PUBLICATIONS

International Search Report corresponding to International Patent Application No. PCT/EP2022/070744, dated Oct. 7, 2022 (5 pages).
(Continued)

*Primary Examiner* — Kathleen V Nguyen
(74) *Attorney, Agent, or Firm* — Maginot, Moore & Beck LLP

(57) ABSTRACT

An arrangement for recording an infrared image inside a means of locomotion includes an infrared camera, a plurality of LEDs, and a screen. The infrared camera is arranged on a printed circuit board. The plurality of infrared LEDs is arranged statically in the means of locomotion. The screen is arranged between each of the plurality of LEDs and the infrared camera.

17 Claims, 3 Drawing Sheets

(51) Int. Cl.

| | |
|---|---|
| *G03B 15/06* | (2021.01) |
| *G03B 30/00* | (2021.01) |
| *H04N 23/52* | (2023.01) |
| *H04N 23/55* | (2023.01) |
| *H04N 23/56* | (2023.01) |
| *B60K 35/10* | (2024.01) |

(52) U.S. Cl.
    CPC ............. *H04N 23/52* (2023.01); *H04N 23/55*
        (2023.01); *H04N 23/56* (2023.01); *B60K*
        *35/10* (2024.01); *B60K 2360/21* (2024.01);
        *B60K 2360/332* (2024.01); *G03B 2215/0567*
        (2013.01)

(56) References Cited

U.S. PATENT DOCUMENTS

| | | | |
|---|---|---|---|
| 2020/0021722 A1* | 1/2020 | Chen ...................... | H04N 23/20 |
| 2020/0029002 A1* | 1/2020 | Polak ..................... | H04N 23/50 |
| 2020/0195816 A1 | 6/2020 | Stein et al. | |

OTHER PUBLICATIONS

Written Opinion corresponding to International Patent Application
No. PCT/EP2022/070744, dated Oct. 7, 2022 (5 pages).
German Search Report corresponding to German Patent Application
No. 10 2022 100 331.0, dated May 18, 2022. (6 pages).

\* cited by examiner

MEANS OF LOCOMOTION AND ARRANGEMENT FOR RECORDING AN INFRARED IMAGE

The present application is the U.S. national phase of PCT Application PCT/EP2022/070744 filed on Jul. 25, 2022, which claims priority of German patent application No. 10 2021 100 331.0 filed on Jan. 10, 2022, the entire contents of which are incorporated herein by reference.

TECHNICAL FIELD

The present disclosure relates to a means of locomotion and to an arrangement for recording an infrared image inside the means of locomotion. In particular, the present disclosure relates to an improved homogeneity and reduced loss of image quality due to scattered infrared light entering the camera arrangement.

BACKGROUND

Modern means of locomotion comprise a multiplicity of interior sensors by means of which actions, in particular gestures and viewing directions of passengers, can be optically detected. In order to achieve evaluable results even with low light intensities, cameras which can record the processes in the interior of the means of locomotion in optical darkness because of their sensitivity in the infrared range are also being used increasingly. In order to increase the intensity of the infrared range in the means of locomotion, such camera arrangements comprise in particular infrared LEDs which need to be adapted to the requirements of the camera and the place of use. The LEDs are therefore often provided as a component of a module that comprises the camera.

In wide-angle cameras, however, the acquisition range (aperture angle) of the camera is sometimes more than 140°, while the LEDs emit significant light intensities over a usually much narrower angle range. Illumination of the spatial region acquired by the wide-angle camera can therefore be ensured in particular only if many infrared LEDs are provided in the camera arrangement. When a plurality of LEDs are installed, moreover, the light cones sometimes overlap unfavorably so that intersections with illuminations of substantially higher intensity occur. Yet for optimal acquisition and interpretability of the processes in the interior, it is necessary to ensure illumination that is as homogeneous as possible. If too many LEDs are installed for homogeneous illumination, this has a detrimental effect on the energy consumption and the heat radiated.

There is a need, therefore, for an arrangement for infrared image recordation that alleviates or obviates the aforementioned disadvantages.

SUMMARY

The above-discussed need, as well as others, are addressed by an arrangement for recording an infrared image inside a means of locomotion as provided herein. The arrangement could also be referred to as a "camera arrangement", the arrangement comprising an infrared camera arranged on a printed circuit board and a multiplicity of infrared LEDs arranged statically in the means of locomotion. In other words, the infrared LEDs are arranged fixed in relation to the printed circuit board and the infrared camera. In the means of locomotion, this offers the advantage that vibrations which are unavoidable during operation cannot cause functional errors in the arrangement if a sufficiently firm connection is ensured. A screen is additionally provided, the screen shielding the optics of the infrared camera from the light of the infrared LEDs. In other words, an optical axis or an optical path existing directly, or indirectly via components of the arrangement, between the respective LED and the optics of the camera is interrupted by the screen. In this way, the light of the LEDs can almost exclusively be reflected in the direction of the infrared camera by reflection from the environment of the arrangement, and the sensor of the infrared camera does not receive such (stray) light from the LEDs. This increases the image quality of the arrangement.

The dependent claims present addition refines of the systems and methods described herein.

The screen may comprise an infrared-light-absorbing surface. In this way, it is possible to prevent the infrared radiation reflected by the screen from leading via further elements of the arrangement to undesired impingement on the optical sensor of the infrared camera. In particular, however, the screen may comprise a surface that reflects infrared radiation, in order to improve the luminous efficiency of the arrangement and to reflect infrared light purposely into the environment of the arrangement, so that the best possible homogeneity of the light intensity distribution is obtained.

The infrared camera may, for example, have an optical principal axis which is perpendicular to the printed circuit board of the arrangement. In other words, the camera "looks" in the direction of a surface normal of the printed circuit board and may therefore be fastened extremely compactly by means of soldering points, clip connections, adhesive bonds, or the like on the printed circuit board. This reduces the size of the arrangement and increases its stability and durability.

The LEDs may in particular have a respective optical axis which is perpendicular to the printed circuit board. In other words, the principal emission direction of the respective LEDs is oriented in the direction of a surface normal of the printed circuit board so that an intensity distribution of the infrared light which is symmetrical in relation to the printed circuit board is possible. Preferably, however, the respective optical axis of the LEDs may also be inclined on the printed circuit board. For example, the optical axis may be inclined away from an optical principal axis of the infrared camera. In this way, an emission characteristic in which the LEDs light, or primarily illuminate, respective subranges of the acquisition range of the infrared camera may be achieved. Best possible homogenization the of intensity distribution may therefore be achieved by the fewest possible LEDs and least possible thermal emission.

The screen may in particular be fastened on the printed circuit board. The screen is therefore to be understood, for example, as a structure which extends around the infrared camera, inside which the infrared d camera is arranged and outside which the LEDs are arranged. In this way, it is particularly readily possible to avoid the screen also being configured to be light-tight in relation to the surface of the printed circuit board. On an opposite side from the printed circuit board, the screen may end at least at a height of a lens of the infrared camera or even higher than the lens of the infrared camera. If the infrared camera comprises a cover that protects the lens, the risk may in principle arise that infrared light of the LEDs enters between the screen and the cover, is reflected at the cover and subsequently impinges on the lens and the sensor of the infrared camera as undesired stray light. In order to prevent this, the screen may touch the protective cover, and in particular touch it fully circumferentially, so that no light can pass through between the surface of the cover and the screen. In principle, however, a reflection at an opposite surface of the cover from the camera may then also lead to the radiation of the infrared LEDs being reflected into the lens of the camera. For this reason, in particular, the screen may be set into the cover. For this purpose, the cover may for example have a groove corresponding to the contact surface of the screen, or another type of recess, in order to further reduce the light intensity that could be reflected at the surface of the cover facing away from the camera. Ideally, the protective cover is interrupted at the place where the screen protrudes relative to the lens, so that the screen also fully penetrates through the surface of the cover and no surface of the cover can contribute to the reflection of direct infrared radiation. This ensures that the lens only forwards reflection radiation received from the environment of the arrangement to the camera sensor system for imaging.

The screen may be adhesively bonded onto the surface of the cover or adhesively bonded into a groove in the surface of the cover. Depending on the manufacturing method, it may also be suitable to cast the cover onto the screen, weld it to the screen or clip/latch it to the screen. Such a firm connection between the screen and the cover can reduce noise, optical short circuits and abrasive processes between the cover and the screen.

If a cover is provided in the arrangement, the multiplicity of infrared LEDs may be arranged between the cover and the printed circuit board. In other words, the LEDs are enclosed between a by the cover, the printed circuit board, the screen in an optionally provided housing body. This can also prevent foreign bodies from being able to reach the LEDs and exert an unforeseen influence on the light intensity distribution.

In order to optimize the light distribution, the screen may have a hyperbolic surface facing toward the LEDs, which in particular constitutes an outer face of a rotationally symmetrical reflector. In this way, the hyperbolic surface can lead to particularly homogeneous illumination of the environment of the arrangement. An inner surface of the screen may, for example, have a cylindrical shape. In particular, the inner lateral face is configured to be nonreflective in order to avoid reflections inside the screen and to reduce the image quality. In other words, the infrared camera is arranged inside a screen so that LEDs surrounding the screen on the one hand achieve a homogeneous light intensity distribution and on the other hand have no effect due to stray light.

Preferably, the arrangement may comprise a housing inside which the printed circuit board, the cover and the screen as well as the infrared camera are arranged. The housing may enclose the aforementioned elements. The aforementioned elements may in particular be connected directly or indirectly to the housing. In this way, a compact and stable module is provided, which does not risk any functional impairments, background noises or other detrimental developments over the lifetime of a means of locomotion.

According to a second aspect, a means of locomotion is proposed, which comprises an arrangement according to the first aspect mentioned. The means of locomotion may for example be configured as an automobile, goods vehicle, motorcycle, truck, aircraft and/or watercraft. The means of locomotion comprises an arrangement which may be arranged for example as an interior camera in the instrument cluster, dashboard, in an A-pillar, in a roof function center (roof operating module), a base of a rearview mirror or elsewhere, or may be adapted to be arranged there. In this way, the means of locomotion is adapted to implement the features, feature combinations and resulting advantages in a correspondingly evident way, so that reference is made to the comments above in order to avoid repetitions.

The above-described features and advantages, as well as others, will become more readily apparent to those of ordinary skill in the art by reference to the following detailed description and accompanying drawings.

BRIEF DESCRIPTION OF THE DRAWINGS

FIG. 1 shows an automobile as a means of locomotion 10, on the windshield of which an arrangement 1 comprising a camera 3 and infrared LEDs 4 is arranged. The infrared LEDs 4 each have relatively narrow light cones with the margins 41, 42, 43, 44. Only in the direction of an optical principal axis of the infrared camera 3, which also contains the face of a user, are the marginal regions of the light cones superimposed. The optical principal axis 6 is perpendicular to a printed circuit board (not represented) on which the camera 3 is fastened. An acquisition range of the infrared camera 3 is characterized by the range margins 31, 32. These run substantially parallel to the margins 41, 44 of the light cones.

FIG. 2 shows a sectional side view through an arrangement 1 according to the disclosure. An infrared camera 3 is provided with a lens 9 and a body 3b as well as a pixel sensor 3a, and is arranged on a printed circuit board 2 in such a way that its principal axis 6 is normal to the surface of the printed circuit board A cover 11 protects the camera 3 against environmental influences. Infrared LEDs 4 are arranged on the right and left of the camera 3, their optical principal axes 7a, 7b being oriented inclined away from the camera 3. The infrared LEDS 4 each comprise lenses 9 which influence the emission characteristic of the infrared light. In particular, the lenses 9 concentrate the respectively emitted light onto a solid angle range which is narrower than the acquisition range of the camera 3. The infrared LEDs each have printed circuit boards 2a, 2b which are inclined according to the principal axes 7a, 7b and are connected to the main printed circuit board 2 by bond wires 12. A screen 5 is provided between the LEDs 4 and the camera 3, its ends facing toward the cover 11 being set into the cover 11. This prevents radiation emitted by the LEDS 4 from being able to be reflected in the direction of the lens 9 at a surface of the cover 11 facing toward the camera 3. The screen 5 may be configured as a hollow cylinder and fastened either exclusively on the cover 11 or, alternatively or additionally, on the printed circuit board 2.

FIG. 3 shows a second exemplary embodiment of an arrangement 1 according to the disclosure, in which the screen 5 has a hollow cylindrical inner wall which is configured to absorb light but its outer face is in the shape of a hyperbola and configured to reflect light. The screen 5 is fastened both on the printed circuit board 2 and on the cover 11. By the hyperbolic outer face, the light emitted by the infrared LEDs 4 can be favorably influenced in respect

Figure 1:
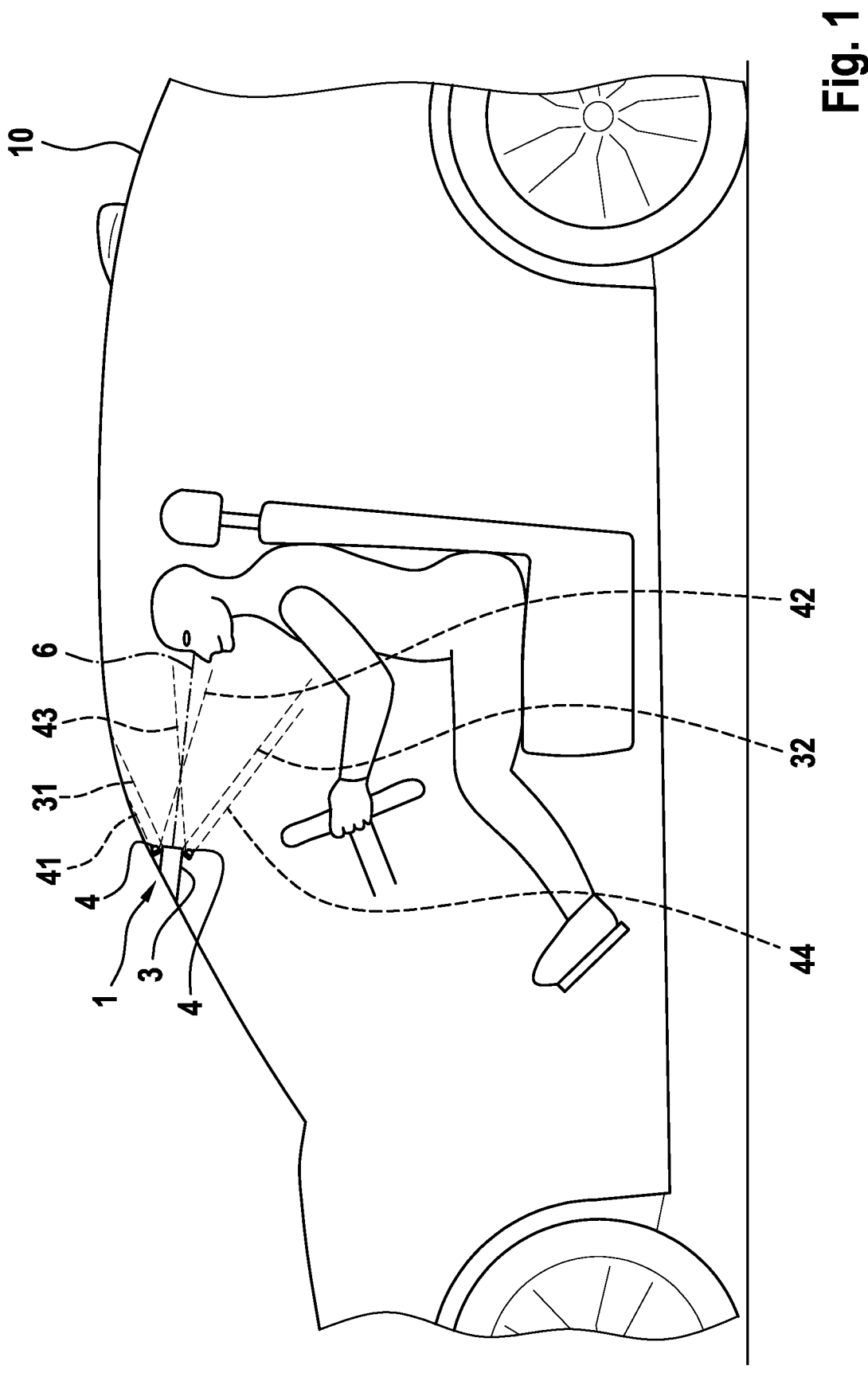
FIG. 1 shows a schematic side view of an exemplary embodiment of a means of locomotion configured with an exemplary embodiment of an arrangement according to the disclosure.
Figure 2:
FIG. 2 shows a sectional side view of a first exemplary embodiment of an arrangement according to the disclosure.
Figure 3:
FIG. 3 shows a sectional side view of a second exemplary embodiment of an arrangement according to the disclosure.

5 of its intensity distribution, in such a way that the infrared LEDs 4 can have a principal emission axis 7*a*, 7*b* which is perpendicular to a surface of the printed circuit board 2. This allows significantly more economical manufacture and a reduction of the number of parts. In particular, wiring of the LEDs to the printed circuit board 2 may be carried out in a substantially automated fashion so that bond wires (see FIG. 2, reference sign 12) can be obviated. A housing 13 is additionally indicated on the left side, which has a groove to receive the cover 11 and a groove to receive the printed circuit board 2. The housing 13 may for this purpose, in particular, be configured in multiple parts and ensure predefined positioning of the cover 11 as well as of the printed circuit board 2. The screen 5 itself may be made from plastic, metal, glass or another material. In particular, a surface coating to influence the light absorption or reflection behavior may be provided subsequently as a varnish or vapor-deposited surface, or the like. On its side facing toward the cover 11, the screen 5 may penetrate at least approximately through the cover 11 so that the cover 11 may be configured in multiple parts (for example an inner disk and an outer ring).

LIST OF REFERENCE SIGNS

1 arrangement
2 printed circuit board
2*a*, 2*b* LED printed circuit board
3 camera
3*a* image sensor
3*b* body
4 LED
5 screen
6 optical principal axis
7*a*, 7*b* optical principal axis
9 lens
10 means of locomotion
11 cover
12 bond wire
13 housing
31, 32, 41, 42, 43, 44 margins

The invention claimed is:

1. An arrangement for recording an infrared image inside a means of locomotion, comprising:
 an infrared camera arranged on a printed circuit board,
 a plurality of infrared LEDs arranged statically in the means of locomotion, and
 a screen,
 wherein the screen is arranged between each of the plurality of LEDs and the infrared camera;
 wherein the screen has a hyperbolic concave surface facing toward the LEDs.

2. The arrangement as claimed in claim 1, wherein
 each of the plurality of LEDs has a respective optical axis which is perpendicular to, or inclined with respect to, the printed circuit board.

3. The arrangement as claimed in claim 1, further comprising:
 a base which holds at least one of the plurality of LEDs above the printed circuit board, wherein the base is configured at least in portions frustoconically or as a circuit board.

4. The arrangement as claimed in claim 1, wherein the hyperbolic surface is an outer face of a body that has a cylindrical inner lateral face.

5. The arrangement as claimed in claim 1, further comprising a housing which encloses the infrared camera, the printed circuit board and the screen.

6. A locomotion apparatus comprising an arrangement as claimed in claim 1.

7. The arrangement as claimed in claim 1, wherein
 the infrared camera has an optical principal axis which is perpendicular to the printed circuit board.

8. The arrangement as claimed in claim 7, wherein
 each of the plurality of LEDs has a respective optical axis which is perpendicular to, or inclined with respect to, the printed circuit board.

9. The arrangement as claimed in claim 1, wherein the screen ends at a-height of a lens of the infrared camera or above the lens.

10. The arrangement as claimed in claim 9, wherein the screen is flush with a cover that protects the lens.

11. The arrangement as claimed in claim 10, wherein the screen is set into a surface of the cover.

12. The arrangement as claimed in claim 10, wherein the LEDs are arranged between the cover and the printed circuit board.

13. The arrangement as claimed in claim 10, further comprising a housing which encloses the infrared camera, the printed circuit board, the cover, and the screen.

14. The arrangement as claimed in claim 1, wherein the infrared camera includes a lens, a body and a pixel sensor, the pixel sensor disposed on a surface of the printed circuit board.

15. The arrangement as claimed in claim 14, wherein the lens has a convex upper surface, and wherein a cover extends over the lens and the screen.

16. The arrangement as claimed in claim 15, wherein the body extends from a first location adjacent to the pixel sensor to a second location adjacent to the lens, and wherein the body is wider at the second location than at the first location.

17. The arrangement as claimed in claim 15, wherein the LEDs are arranged between the cover and the printed circuit board.

* * * * *